United States Patent [19]

Kunibe et al.

[11] Patent Number: 5,653,659

[45] Date of Patent: Aug. 5, 1997

[54] AUTOMATIC ENGINE STOP-START SYSTEM

[75] Inventors: Yujiro Kunibe, Kawasaki; Hidefumi Tamai, Ebina, both of Japan

[73] Assignee: Isuzu Motors Limited, Tokyo, Japan

[21] Appl. No.: 534,848

[22] Filed: Sep. 27, 1995

[51] Int. Cl.⁶ .................................................. B60K 41/04
[52] U.S. Cl. ............................................ 477/111; 477/110
[58] Field of Search .............................. 477/111, 99, 107, 477/110, 112, 113

[56] References Cited

U.S. PATENT DOCUMENTS 3,779,349  12/1973  Maruoka ................................ 477/111
4,362,133  12/1982  Malik ....................................... 477/99
4,371,051   2/1983  Achterholt .......................... 477/111

Primary Examiner—Charles A. Marmor
Assistant Examiner—Sherry Lynn Estremsky

[57] ABSTRACT

An automatic engine stop-start system automatically stops an engine to reduce the fuel consumption whenever a predetermined condition is fulfilled and automatically starts the engine whenever another predetermined condition is fulfilled. This system is particularly arranged to detect gearshift lever position of an automatic transmission to determine various automatic stop/start conditions so that an engine in a car with an automatic transmission can be automatically stopped/started.

11 Claims, 15 Drawing Sheets

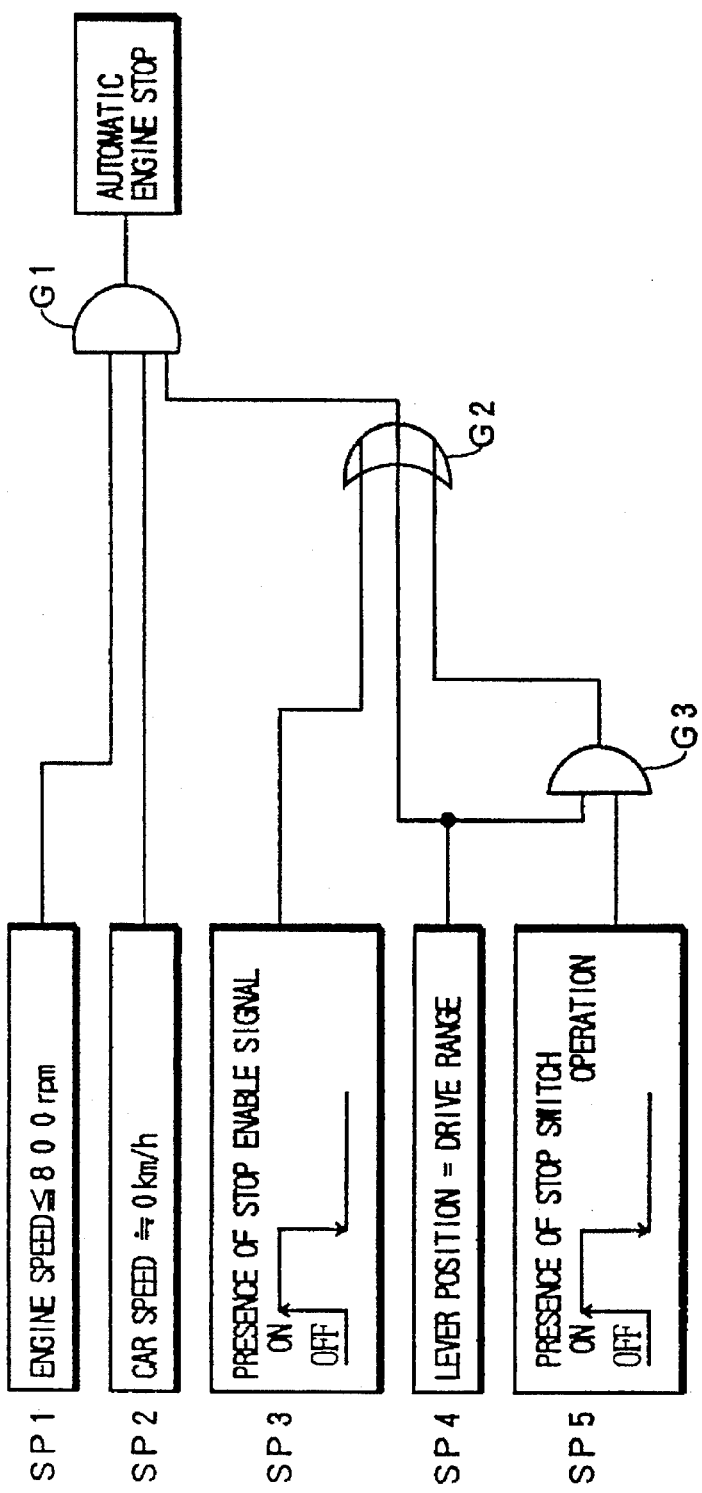

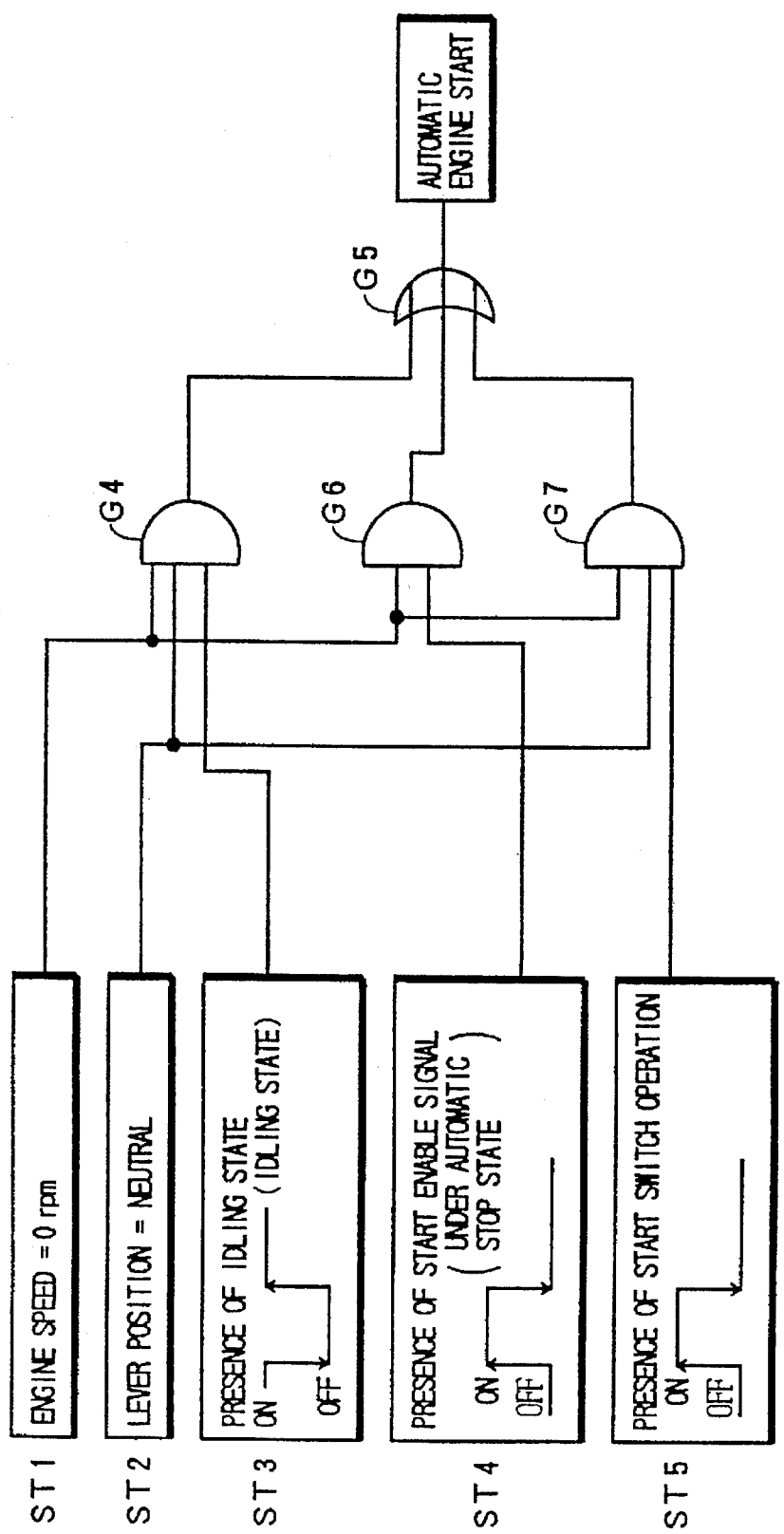

AUTOMATIC ENGINE STOP-START SYSTEM

BACKGROUND OF THE INVENTION

1. Field of the Invention

The present invention relates to an automatic engine stop-start system, and in particular to an automatic engine stop-start system which automatically stops or starts an engine in case predetermined conditions are fulfilled in a vehicle such as a motorcar.

2. Prior Art

Generally, when a vehicle stops at a crossing in the street or the like, idling the engine of the vehicle will consume a certain amount of fuel and decrease the fuel consumption rate of the engine.

Accordingly, there has been proposed an automatic engine stop-start system which automatically stops the engine to reduce the fuel consumption thereof during temporary stops every time such a predetermined condition (stop condition) that the car has stopped is fulfilled and which then automatically starts or restarts the engine every time another predetermined condition (start condition) is fulfilled.

The stop condition and the start condition in such an automatic engine stop-start system are schematically shown in FIGS. 1A and 1B, respectively.

The stop condition requires four items shown in FIG. 1A such that:

(1) Car speed is approximately 0 Km/h;

(2) Engine rotating speed is below 800 rpm;

(3) Gear position is neutral; and, (4) Clutch pedal is stepped on or depressed.

Additionally, the following items should be preferably included in the stop condition shown by dotted lines in FIG. 1A such that:

(5) Cooling water temperature of the engine is equal to or above 40° C.;

(6) Air pressure is equal to or above 64 KPa;

(7) A car speed higher than 10 Km/h after the initiation of the system is once detected; and, (8) No fault is found by self-diagnosis.

Specifically, the condition for automatic engine stop is that (1) a car is stopped, (2) the engine is idling, (3) the gear position is neutral, (4) no clutching operation is made, and preferably that (5) the engine is warmed up, (6) the air pressure of the air tank for the air cylinder (see FIG. 4) is sufficient for the automatic engine stop, (7) it has been confirmed that the car has started at least once after the engine key had been switched on, and (8) no fault is found.

When the above stop condition is fulfilled, the intake shutter (see FIG. 4) is shut by the air cylinder to stop the air suction of the engine whereby the engine is automatically stopped to prevent the fuel from being uselessly consumed and to reduce exhaust gas or noise.

On the other hand, the condition for restarting (hereinafter referred to simply as starting) the engine after the engine has been stopped on the basis of the above-noted stop condition requires three well-known items shown in FIG. 1B such that:

(1) Engine speed is 0 rpm;

(2) Gear position is neutral;

(3) Clutch is engaged.

It is, however, disadvantageous that although the above prior art automatic engine stop-start system can be mounted on a manual transmission (MT) car, it can not be adapted to an automatic transmission (AT) car.

SUMMARY OF THE INVENTION

Accordingly, it is an object of the present invention to provide an automatic engine stop-start system which automatically stops an engine to reduce the fuel consumption whenever a predetermined condition or an automatic stop condition is fulfilled and automatically starts the engine whenever another predetermined condition or an automatic start condition is fulfilled and can be particularly mounted to an automatic transmission car.

For achievement of the above-noted object, an automatic engine stop-start system according to the present invention may have various arrangements and operations which will now be described with reference to the automatic stop condition shown in FIG. 2 and the automatic start condition shown in FIG. 3.

(1) The present invention may be characterized by comprising; means for detecting a gearshift lever position of an automatic transmission; means for detecting an idling state (non-acceleration state) where an accelerator pedal is not stepped on; and a transmission control unit generating a stop enable signal when the gearshift lever position is neutral; the automatic stop condition being dependent on an engine rotating speed, a car speed, and the presence/absence of the stop enable signal, and the automatic start condition being dependent upon an engine rotating speed, the gearshift lever position, and the presence of the idling state.

Specifically, the automatic stop condition as shown in FIG. 2, includes condition SP1 indicating that the engine is idling at a rotating speed which is e.g. equal to or less than 800 rpm, condition SP2 indicating that the car speed is substantially zero, and condition SP3 indicating that when the gearshift lever position detected by the gearshift lever position detecting means is neutral, the transmission control unit generates or turns on the stop enable signal. The fulfillment of this stop condition enables AND gate G1 through OR gate G2 to automatically stop the engine.

The automatic start condition as shown in FIG. 3, includes condition ST1 indicating that the engine speed is zero, condition ST2 indicating that the gearshift lever position is neutral, and condition ST3 indicating that the idling state detecting means detects the idling state being ON. The fulfillment of this start condition enables AND gate G4 to automatically start the engine through OR gate G5.

(2) The present invention may also be characterized by being dependent upon; means for detecting a gearshift lever position of an automatic transmission; and a transmission control unit generating a stop enable signal when the gearshift lever position is neutral and generating a start enable signal during the automatic stop state; the automatic stop condition being dependent upon an engine rotating speed, a car speed, and the presence of the stop enable signal, and the automatic start condition being dependent upon an engine rotating speed and the presence of the start enable signal.

Specifically, the automatic stop condition includes conditions SP1–SP3 as described above in (1) while the automatic start condition, as shown in FIG. 3, includes condition ST1 indicating that the engine speed is zero, and condition ST4 indicating that when the gearshift lever position detected by the gearshift lever position detecting means is neutral and the present state is the automatic stop state, the transmission control unit generates the start enable signal. The fulfillment of this start condition enables AND gate G6 to automatically start the engine through OR gate G5.

(3) The present invention may also be characterized by comprising; means for detecting a gearshift lever position of an automatic transmission; means for manually starting the engine; and a transmission control unit generating a stop enable signal when the gearshift lever position is neutral; the automatic stop condition being dependent upon an engine rotating speed, a car speed, and the presence of the stop enable signal, and the automatic start condition being dependent upon an engine rotating speed, the gearshift lever position, and the presence of the operation of the manually starting means.

Specifically, the automatic stop condition includes conditions SP1–SP3 as described above in (1) while the automatic start condition, as shown in FIG. 3, includes condition ST1 indicating that the engine speed is zero, condition ST2 indicating that the gearshift lever position is neutral, and condition ST5 indicating that the manually starting means is operated "ON". The fulfillment of this start condition enables AND gate G7 to automatically start the engine through OR gate G5.

(4) The present invention may also be characterized by comprising; means for detecting a gearshift lever position of an automatic transmission; and means for detecting an idling state (non-acceleration state) where an accelerator pedal is not stepped on; the automatic stop condition being dependent upon an engine rotating speed, a car speed, and the determination of the gearshift lever position if it is in a drive range, and the automatic start condition being dependent upon an engine rotating speed, the gearshift lever position, and the presence of the idling state.

Specifically, the automatic stop condition, as shown in FIG. 2, includes condition SP1 indicating that the engine is idling, condition SP2 indicating that the car speed is substantially zero, and condition SP4 indicating that the gearshift lever position detected by the gearshift lever position detecting means is in the drive range. The fulfillment of this stop condition enables AND gate G1 through OR gate G2 to automatically stop the engine.

The automatic start condition includes conditions ST1–ST3 as described above in (1) whereby the fulfillment of this start condition enables AND gate G4 to automatically start the engine through OR gate G5, as shown in FIG. 3.

(5) The present invention may also be characterized by comprising; means for detecting a gearshift lever position of an automatic transmission; and a transmission control unit generating a start enable signal when the gearshift lever position is neutral and the present state is the automatic stop state; the automatic stop condition being dependent upon an engine rotating speed, a car speed, and the determination of the gearshift lever position if it is in a drive range, and the automatic start condition being dependent upon an engine rotating speed, and the presence of the start enable signal.

Specifically, the automatic stop condition comprises conditions SP1, SP2, and SP4 as described above in (4) whereby the fulfillment of this stop condition enables AND gate G1 through OR gate G2 to automatically stop the engine, as shown in FIG. 2.

The automatic start condition comprises conditions ST1 and ST4 as described above in (2) whereby the fulfillment of this start condition enables AND gate G6 to automatically start the engine through OR gate G5, as shown in FIG. 3.

(6) The present invention may also be characterized by comprising; means for detecting a gearshift lever position of an automatic transmission; and means for manually starting the engine; the automatic stop condition being dependent upon an engine rotating speed, a car speed, and the determination of the gearshift lever position if it is in a drive range, and the automatic start condition being dependent upon an engine rotating speed, the gearshift lever position, and the presence of the operation of the manually starting means.

Specifically, the automatic stop condition comprises conditions SP1, SP2, and SP4 as described above in (2) whereby the fulfillment of this stop condition enables AND gate G1 through OR gate G2 to automatically stop the engine, as shown in FIG. 2.

The automatic start condition comprises conditions ST1, ST2 and ST5 as described above in (3) whereby the fulfillment of this start condition enables AND gate G7 to automatically start the engine through OR gate G5, as shown in FIG. 3.

(7) The present invention may also be characterized by comprising; means for detecting a gearshift lever position of an automatic transmission; means for manually stopping the engine; and means for detecting an idling state; the automatic stop condition being dependent upon an engine rotating speed, a car speed, the determination of the gearshift lever position if it is a drive range, and the presence of the operation of the manually stopping means, and the automatic start condition being dependent upon an engine rotating speed, the gearshift lever position, and the presence of the idling state.

Specifically, the automatic stop condition, as shown in FIG. 2, includes condition SP1 indicating that the engine is idling, condition SP2 indicating that the car speed is substantially zero, condition SP4 indicating that the gearshift lever position detected by the gearshift lever position detecting means is in the drive range, and condition SP5 indicating that a driver's intention to stop the engine is exhibited by the operation of the manually stopping means. The fulfillment of this stop condition enables AND gate G3 and AND gate G1 through OR gate G2 to automatically stop the engine.

The automatic start condition comprises conditions ST1–ST3 as described above in (1) and (4) whereby the fulfillment of this start condition enables AND gate G4 to automatically start the engine through OR gate G5, as shown in FIG. 3.

(8) The present invention may also be characterized by comprising; means for detecting a gearshift lever position of an automatic transmission; means for manually stopping the engine; and a transmission control unit generating a start enable signal when the gearshift lever position is neutral and the present state is the automatic stop state; the automatic stop condition being dependent upon an engine rotating speed, a car speed, the determination of the gearshift lever position if it is in a drive range, and the presence of the operation of the manually stopping means, and the automatic start condition being dependent upon an engine rotating speed, and the presence of the start enable signal.

Specifically, the automatic stop condition comprises conditions SP1, SP2, SP4, and SP5 as described above in (7) whereby the fulfillment of this stop condition enables AND gate G3 and AND gate G1 through OR gate G2 to automatically stop the engine, as shown in FIG. 2.

The automatic start condition comprises conditions ST1 and ST4 as described above in (2) and (5) whereby the fulfillment of this start condition enables AND gate G6 to automatically start the engine through OR gate G5, as shown in FIG. 3.

(9) The present invention may also be characterized by comprising; means for detecting a gearshift lever position of an automatic transmission; means for manually stopping the engine; and means for manually starting the engine; the automatic stop condition being dependent upon an engine rotating speed, a car speed, the determination of the gearshift lever position if it is a drive range, and the presence of the operation of the manually stopping means, and the automatic start condition being dependent upon an engine rotating speed, the gearshift lever position, and the presence of the operation of the manually starting means.

Specifically, the automatic stop condition comprises conditions SP1, SP2, SP4, and SP5 as described above in (7) whereby the fulfillment of this stop condition enables AND gate G3 and AND gate G1 through OR gate G2 to automatically stop the engine, as shown in FIG. 2.

The automatic start condition comprises conditions ST1, ST2, and ST5 as described above in (3) and (6) whereby the fulfillment of this start condition enables AND gate G7 to automatically start the engine through OR gate G5, as shown in FIG. 3.

(10) In the automatic engine stop-start system according to the present invention as above described, the transmission control unit may determine the presence of the automatic stop or start enable signal from the rising or falling edges, whereby the presence of the enable signals can be more precisely determined.

(11) Also, the presence of the output signal of the idling state detecting means, and the manually stopping or starting means for the engine may be determined from the rising or falling edges, whereby the presence of the enable signals can be more precisely determined.

(12) Furthermore, the gearshift lever position is not included for the determination of the presence of the automatic stop or start enable signal in the above, whereas it is possible to make sure the automatic stop or start of the engine by determining if the gearshift lever position is neutral.

As described above, an automatic engine stop-start system according to the present invention is arranged to detect a gearshift lever position of an automatic transmission to determine various automatic stop/start conditions so that an engine in a car with an automatic transmission can be automatically stopped/started.

BRIEF DESCRIPTION OF THE DRAWINGS

FIG. 2 is a block diagram illustrating an automatic stop condition of the automatic engine stop-start system according to the present invention;

FIG. 3 is a block diagram illustrating an automatic start condition of the automatic engine stop-start system according to the present invention;

Throughout the Figures, like reference numerals indicate like or corresponding components.

DETAILED DESCRIPTION OF THE PREFERRED EMBODIMENT

Hereinafter, embodiments of an automatic engine stop-start system according to the present invention will be described referring to the above noted drawings.

Figure 4:
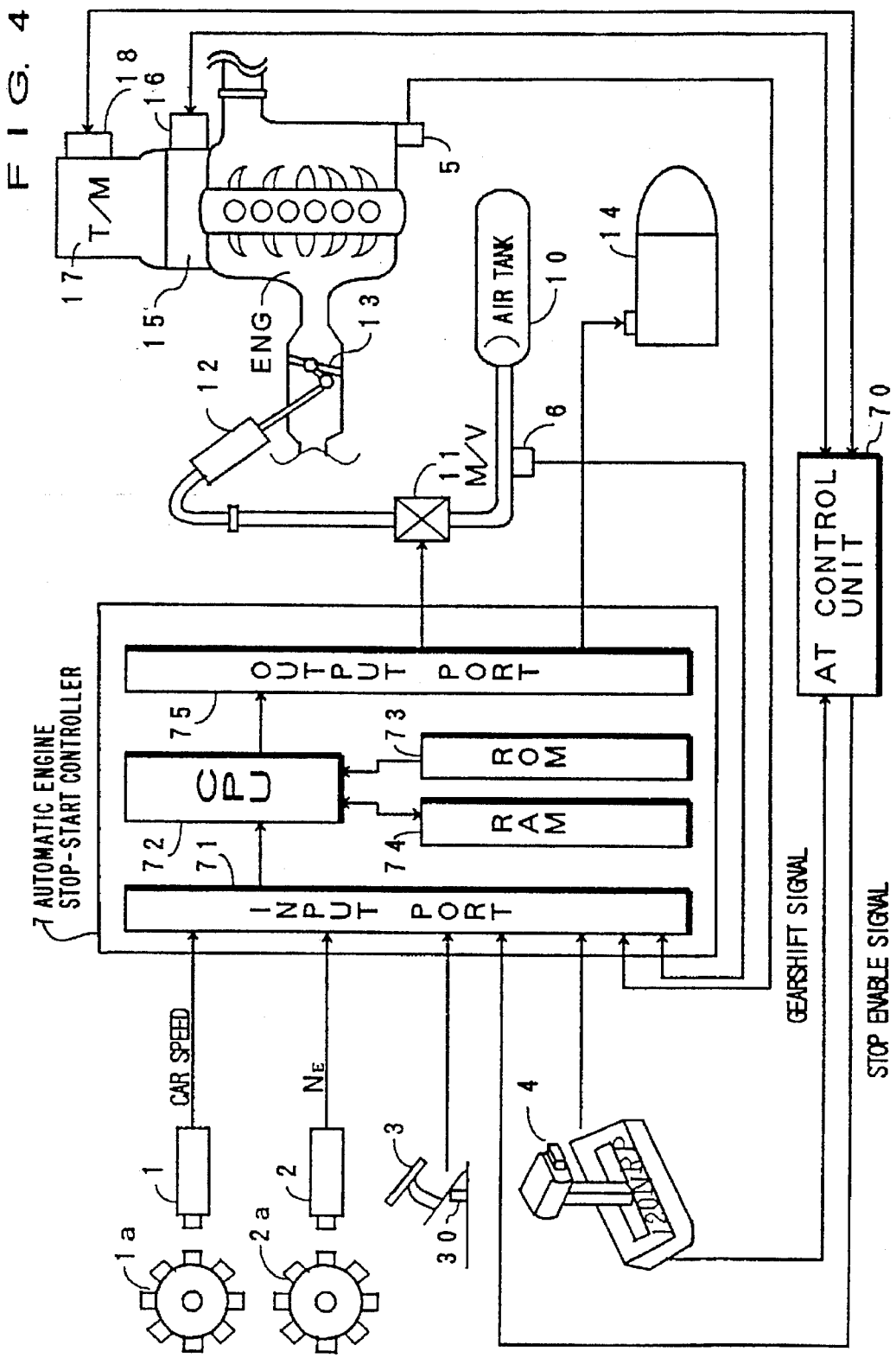
FIG. 4 is a system arrangement diagram illustrating one embodiment of the automatic engine stop-start system according to the present invention (1)

FIG. 4 shows one embodiment of the automatic engine stop-start system according to the present invention (1). In the Figure, a car speed sensor 1 forms means for detecting a car speed from, for example, the rotation of a gear 1a which forms a sensor ring having a plurality of protrusions on the outer periphery and which is mounted on a wheel. An engine speed sensor 2 forms means for detecting an engine speed from, for example, the rotation of a gear 2a mounted on the crankshaft of the engine ENG. An idling position switch 30 (also referred to as switch SW30) forms idling state detecting means for detecting whether or not an accelerator pedal 3 is stepped on by a driver. A gearshift lever 4 forms means for detecting a gearshift lever position of an automatic transmission. A cooling water temperature sensor 5 forms means for detecting cooling water temperature of the engine ENG. An air pressure sensor 6 forms means for detecting air pressure of an air tank 10.

An automatic engine stop-start controller 7 is composed of an input port 71 for taking in the output signals of the sensors 1, 2, 5, and 6 as well as the output signals of the switch 3 and the gearshift lever 4, a central processing unit (hereinafter abbreviated as CPU) 72 for receiving the output signal of the input port 71 to carry out data processing with RAM (Random Access Memory) 74 on the basis of a control program stored in ROM (Read Only Memory) 73, and an output port 75 for taking out the output signal of CPU 72 to the external portion.

An electromagnatic valve (M/V) 11 supplies the air of the air tank 10 to an air cylinder 12 when energized. An intake shutter 13 cuts off the inlet air to the engine ENG by the force of the air from the air cylinder 12 to stop the engine ENG. A starter motor 14 starts the engine ENG according to the output from the output port 75.

An automatic clutch portion 15 includes a clutch actuator 16. An automatic transmission (T/M) 17 is driven by an actuator 18 and is connectable to the engine ENG through the automatic clutch portion 15.

These actuators 16 and 18 are connected to a transmission control unit 70 which receives as an input the output signal of the gearshift lever 4 and provides an engine stop signal for the input port 71 of the controller 7.

Figure 5:
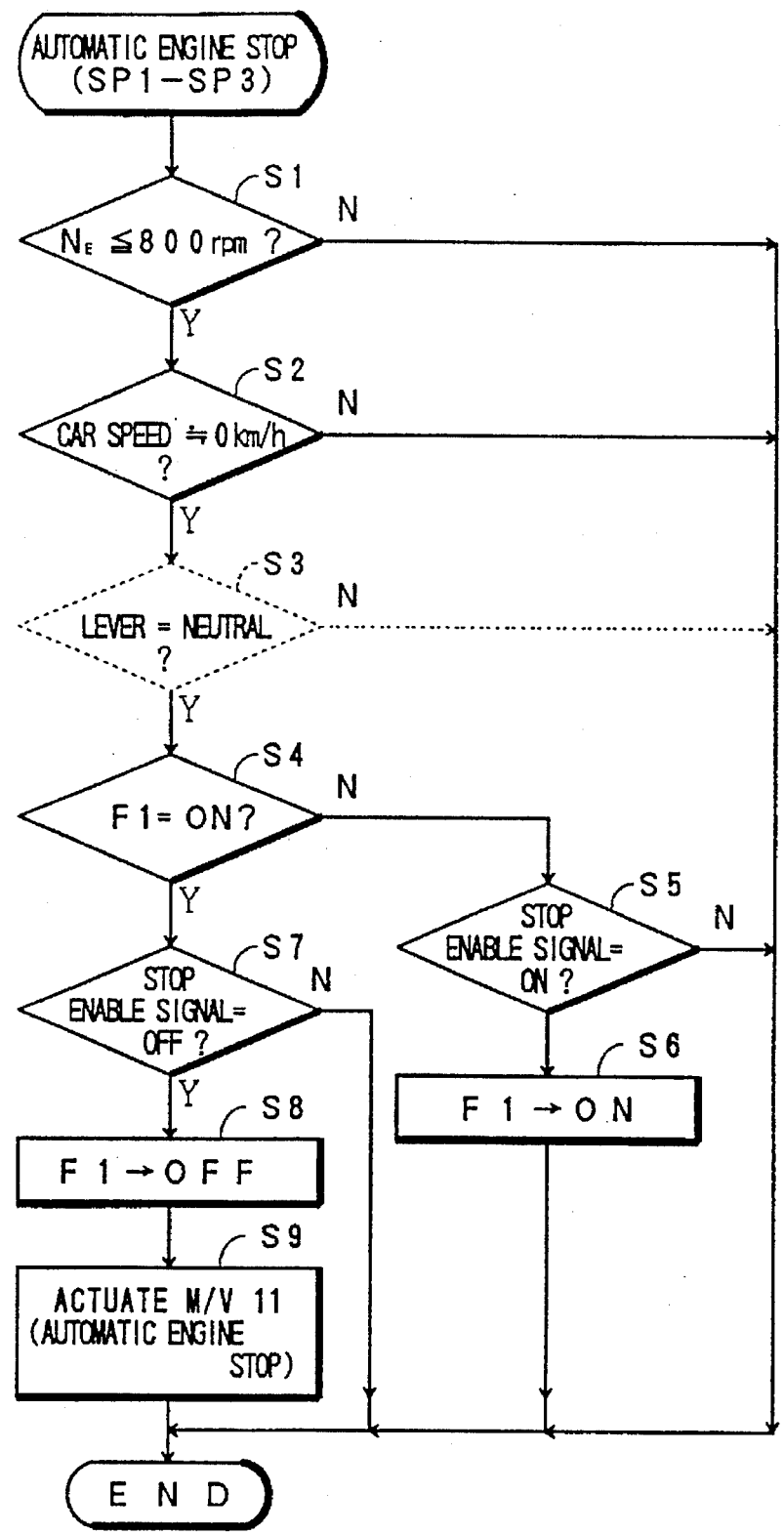
FIG. 5 is a flow chart illustrating a control program for the automatic engine stop in the automatic engine stop-start system according to the present invention (1)
Figure 6:
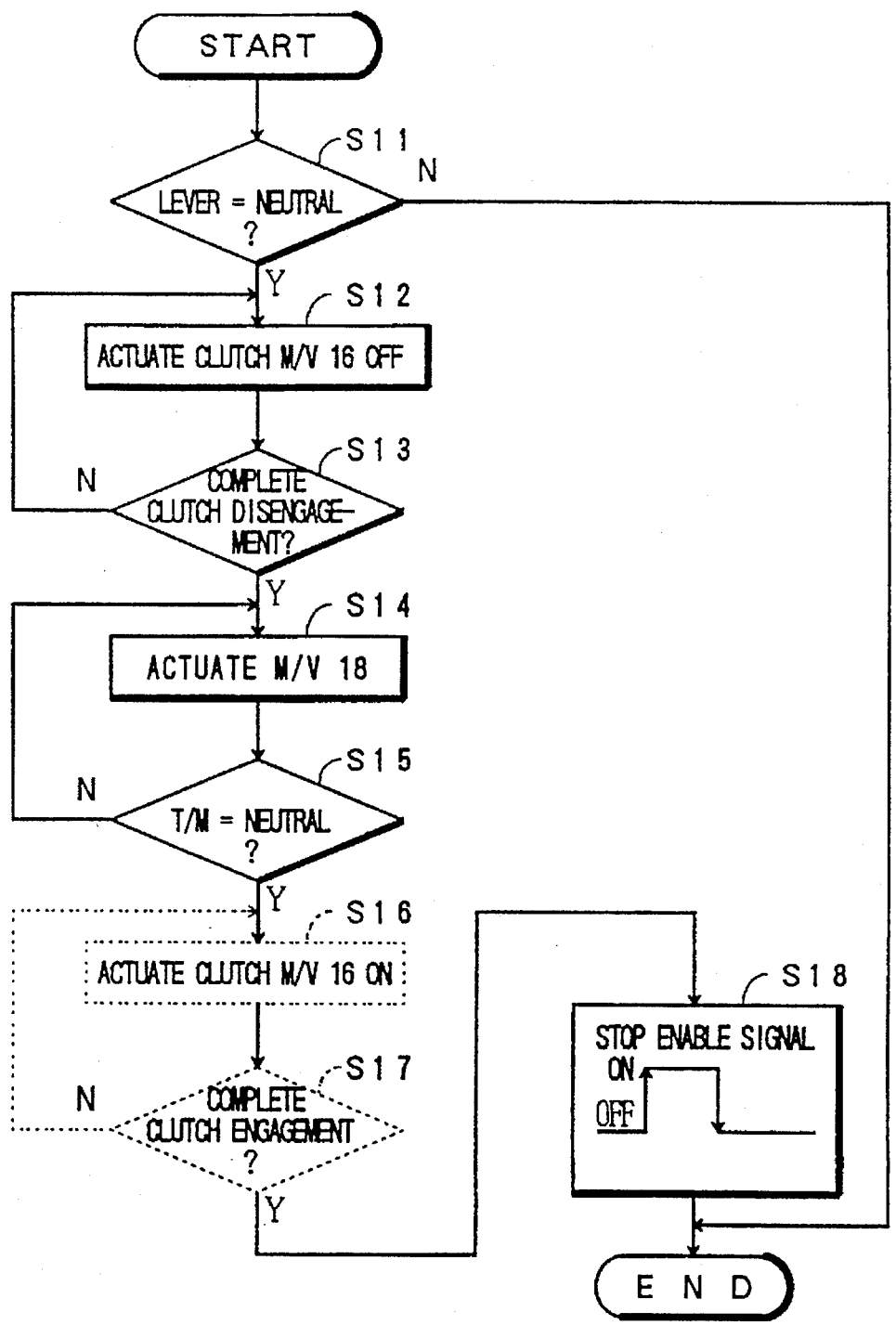
FIG. 6 is a flow chart illustrating the process of genaration of a stop enable signal used in the automatic engine stop-start system according to the present invention.

In this arrangement, CPU 72 of the controller 7 executes control programs illustrated in FIGS. 4–6.

FIG. 5 illustrates an automatic engine stop control program in the present invention (1) wherein the conditions SP1–SP3 shown in FIG. 2 are determined. This control program and the following are executed by interrupting a main program (not shown) at predetermined time intervals.

Preliminarily, CPU 72 reads in an engine speed signal from the engine speed sensor 2, a car speed signal from the car speed sensor 1, and preferably a gearshift lever signal from the gearshift lever 4, all through the inport port 71.

Figure 1A:
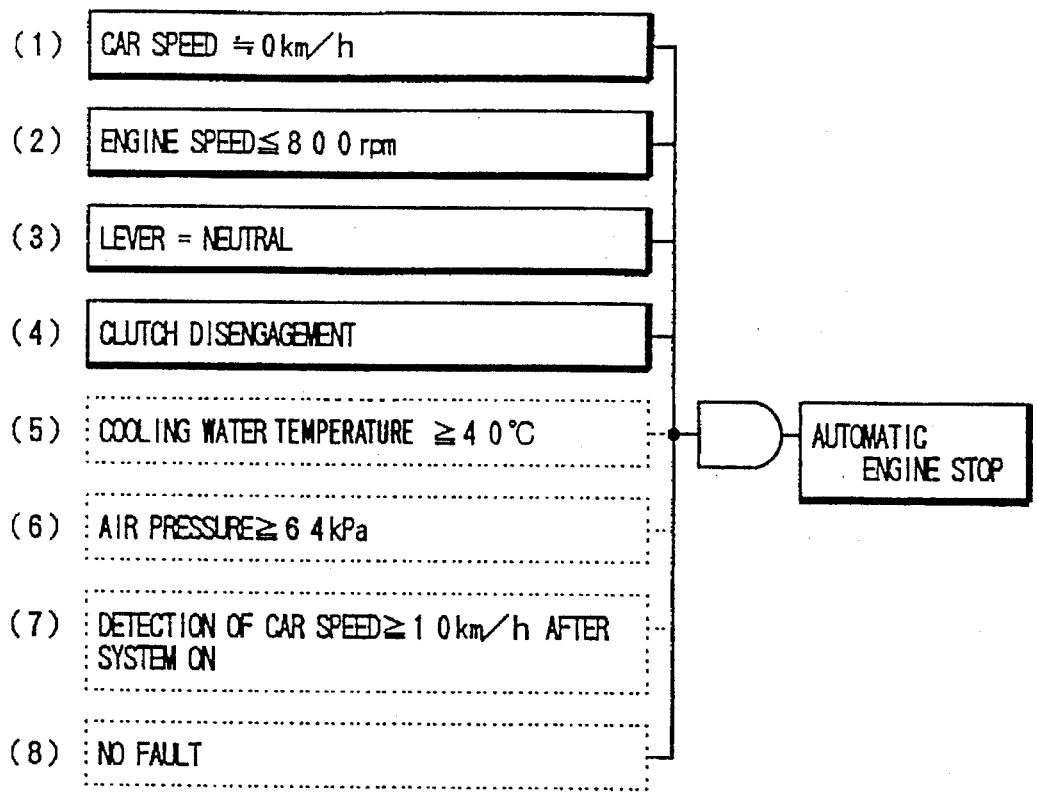
FIGS. 1A and 1B are block diagrams respectively illustrating the start and stop conditions of an automatic engine stop-start system known in the art.
Figure 1B:
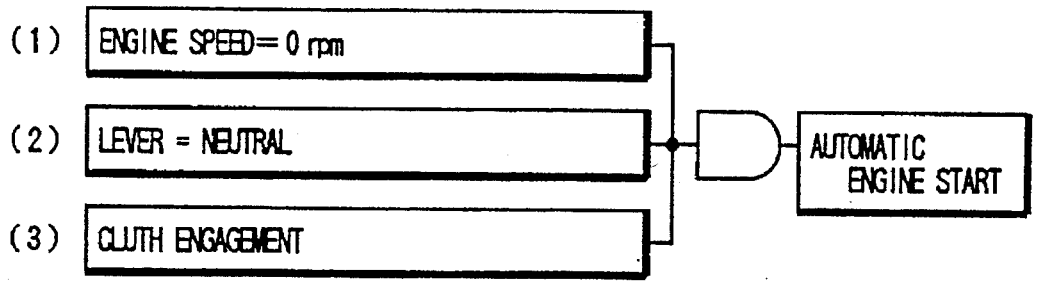

At first, CPU 72 determines at step S1 whether or not the engine speed $N_E$ is in the range of an idling state. In this example, a determination value for the idling state may comprise 800 rpm as shown in FIG. 1A.

As a result of this determination, if the answer is "NO" or the engine speed $N_E$ proves to be in a non-idling state, CPU 72 exits from this program. If the answer is "YES", it will be then determined at Step S2 whether or not the car speed is substantially 0 km/h.

If the determination results in "NO" or the car speed is not found to be substantially 0 km/h or the car is not stopped, CPU 72 exits from this program. If the determination results in "YES" or the car is stopped, it will be then determined at Step S3 whether or not the position of the gearshift lever 4 is neutral. If the determination results in "NO", this program will return to the main program while if the determination results in "YES", this program will proceed to Step S4.

It is to be noted that Step S3 is shown by dotted lines because it may be omitted if the generation of the stop enable signal is determined at Steps S5 and S7 as described later, and the position of the gearshift lever 4 will be always neutral. However, it is possible to make an automatic stop operation more precisely with the additional determination of the gearshift lever position.

At Step S4, it is determined whether or not Flag F1 is set to "ON" or "1". Since Flag F1 is initially OFF, the program proceeds to Step S5 to determine whether or not the stop enable signal from the control unit 70 is ON.

With reference to FIG. 6, the stop enable signal will be generated when the gearshift lever 4 is shifted to the neutral position, which indicates that the engine can be automatically stoped as long as the gearshift lever 4 is neutral.

Namely, in FIG. 6, the control unit 70 determines at Step S11 whether or not the gearshift lever 4 has the neutral position.

If the determination results in "NO", this program will return to the main program while if the determination results in "YES", the clutch actuator will be actuated at Step 312.

After it is confirmed at Step S13 that the clutch 15 had been completely disengaged, the transmission actuator 18 is actuated whereby the transmission 17 is controlled to the neutral at Step S14.

After it is confirmed at Step S15 that the transmission 17 has been controlled to the neutral, the clutch actuator 16 is preferably actuated to engage the clutch 15 at Steps S16 and S17.

After it is confirmed at Step S17 that the clutch has been completely engaged, the stop enable signal is turned "ON" and then turned off in a predetermined time at Step S18.

It is to be noted that the automatic clutch type transmission is controlled such that the clutch is disengaged, the transmission is controlled to the neutral, and then the clutch is engaged, when the gearshift lever is shifted to the neutral position. Therefore, the automatic stop enable signal is generated after the execution of Steps S16 and S17, which can be generated before the execution of Steps S16 and S17, as shown by dotted lines.

Provided with the engine stop enable signal thus generated from the control unit 70 through the input port 71, CPU 72 determines at Step S5 whether or not the stop enable signal is "ON". If the determination results in "OFF", this program will return to the main program while if the determination results in "ON" or the automatic enable signal is found to be "ON", Flag F1 will be turned "ON" at Step S6 in FIG. 5.

Once Flag F1 is turned "ON", as a result of checking Flag F1 again at Step S4, the program will proceed to Step S7 to determine whether or not the automatic stop enable signal is "OFF".

If the determination results in "NO", this program will return to the main program while if the determination results in "YES", Flag F1 is reset to "0" at Step S8 because the stop enable signal has falled from "ON" to "OFF" as shown FIG. 6.

Then, the electromagnetic valve 11 is actuated to supply the air of the air tank 10 to the air cylinder 12, whereby the intake shutter 13 interrupts the suction air so that the engine ENG can be automatically stopped at Step S9.

The reason why Flag F1 is used in the flow chart in FIG. 5 is that since the stop enable signal is turned ON and and then turned OFF in a predetermined time interval as shown in FIG. 6, the presence and absence of the stop enable signal can be accurately detected by detecting a falling edge of the stop enable signal. Similarly, a rising edge from OFF to ON of the stop enable signal can be detected, or simply the ON state of the stop enable signal can be detected.

Also, while such an automatic transmission as shown in the embodiment in FIG. 6 adopts an automatic clutch type having the automatic clutch 15 shown in FIG. 4, it can also adopt a torque converter type except for the condition on the clutch shown in FIG. 6.

Figure 7:
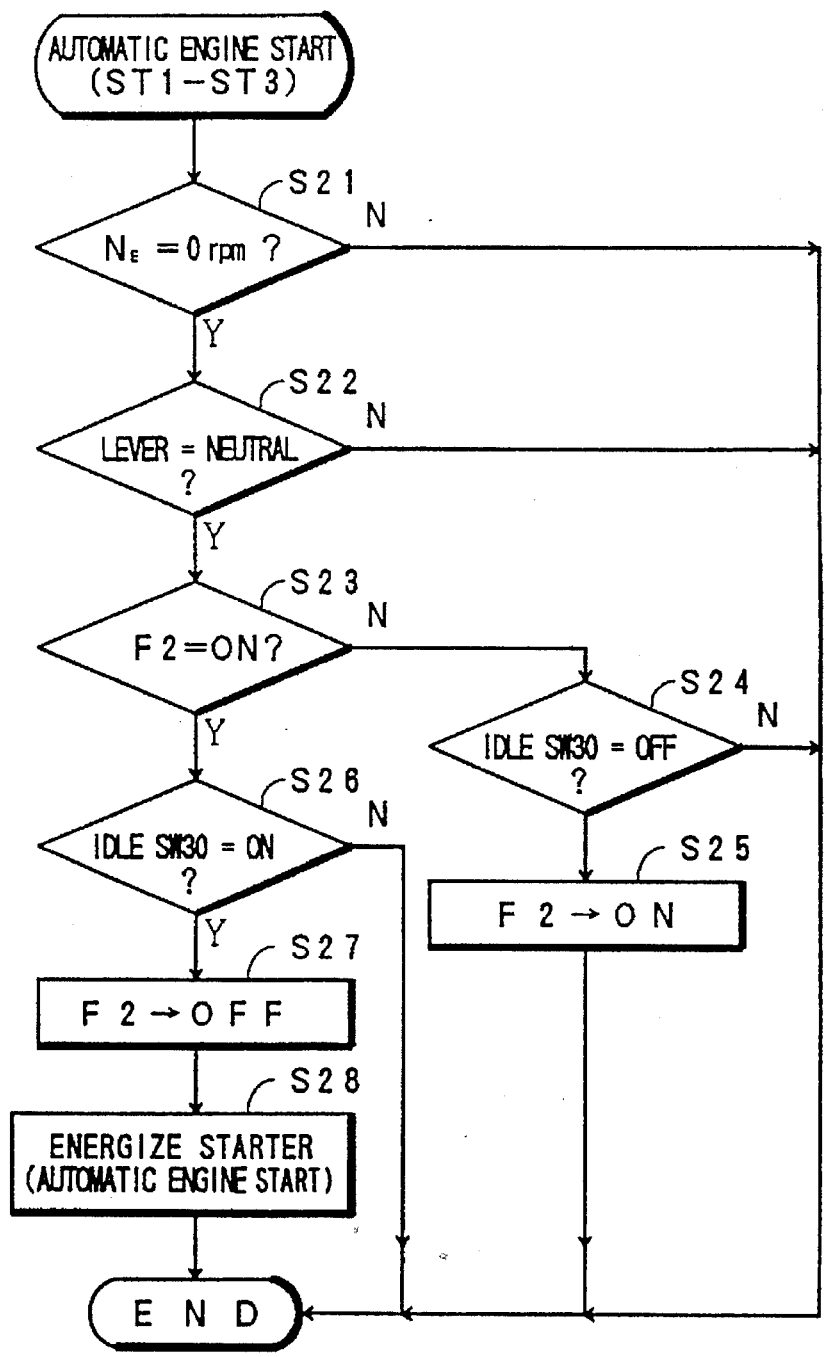
FIG. 7 is a flow chart illustrating a control program for the automatic engine start in the automatic engine stop-start system according to the present invention (1)

FIG. 7 illustrates an automatic engine start control program in the present invention (1) wherein the automatic start condition corresponds to the conditions ST1–ST3 shown in FIG. 3.

At first, CPU 72 determines at Step S21 whether or not the engine speed $N_E$ is 0 rpm.

If the determination results in "NO" or the engine is not automatically stopped, CPU 72 will exit from this program while if the determination results in "YES", it will be then determined at Step S22 whether or not the gearshift lever 4 is positioned neutral.

If the determination results in "NO", CPU 72 will exit from this program while if the determination results in "YES", it will be then determined at Step S23 whether or not Flag F2 is ON.

Since Flag F2 is initially OFF, this program goes to Step S24 from Step S23 to determine whether or not the idle position switch 30 in FIG. 4 is made OFF.

If the determination results in "NO", CPU 72 will exit from this program, while if the determination results in "YES", Flag F2 will be set to "ON" at Step S25.

After Flag F2 is thus set at Step S25, when CPU 72 passes Step S23 again, the program proceeds to Step S26 because Flag F2 is ON, to determine whether or not the idle switch 30 is made ON.

If the determination results in "NO", CPU 72 will exit from this program, while if the determination results in "YES", Flag F2 will be reset to "OFF" at Step S27.

Then the starter motor 14 is energized to automatically start the engine ENG at Step S28.

The reason why Flag F2 is used in the flow chart in FIG. 6 is also to confirm whether or not the idle position switch 30 accurately indicates the idle position by checking a rising edge from OFF to ON of the output signal of the idle position switch 30 as illustrated in FIG. 3. Therefore, a falling edge from ON to OFF of the idle position signal can be similarly detected, or the ON state of the idle position signal can be detected instead.

Figure 8:
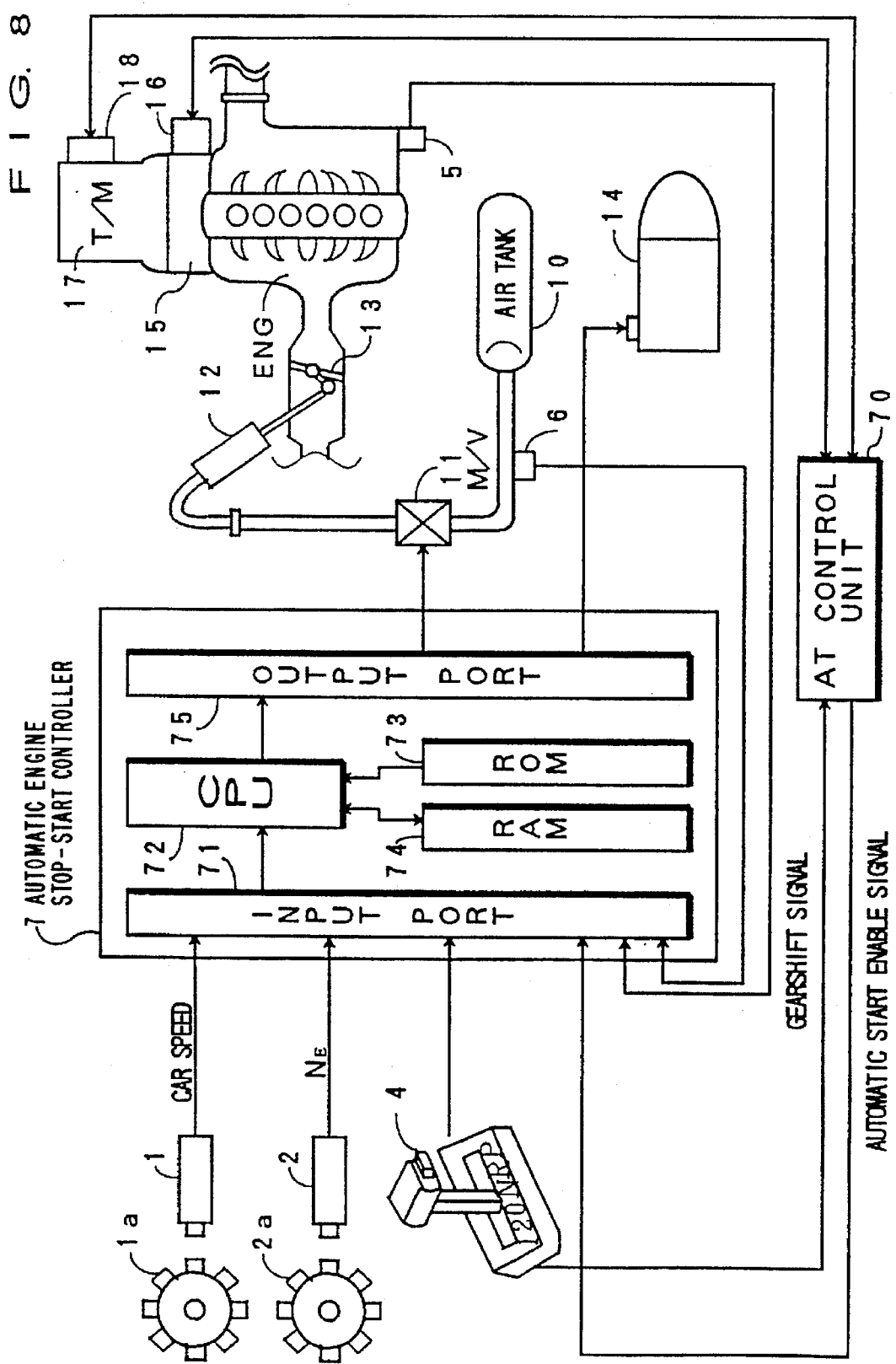
FIG. 8 is a system arrangement diagram illustrating one embodiment of the automatic engine stop-start system according to the present invention (5)

FIG. 8 shows another embodiment of the automatic engine stop-start system according to the present invention (5). This embodiment is different from the embodiment shown in FIG. 4 in that the idle position switch 30 associated with the acceleration pedal is not employed and the AT control unit 70 generates the automatic start enable signal, not the automatic stop enable signal, and provides it for the input port 71.

Figure 9:
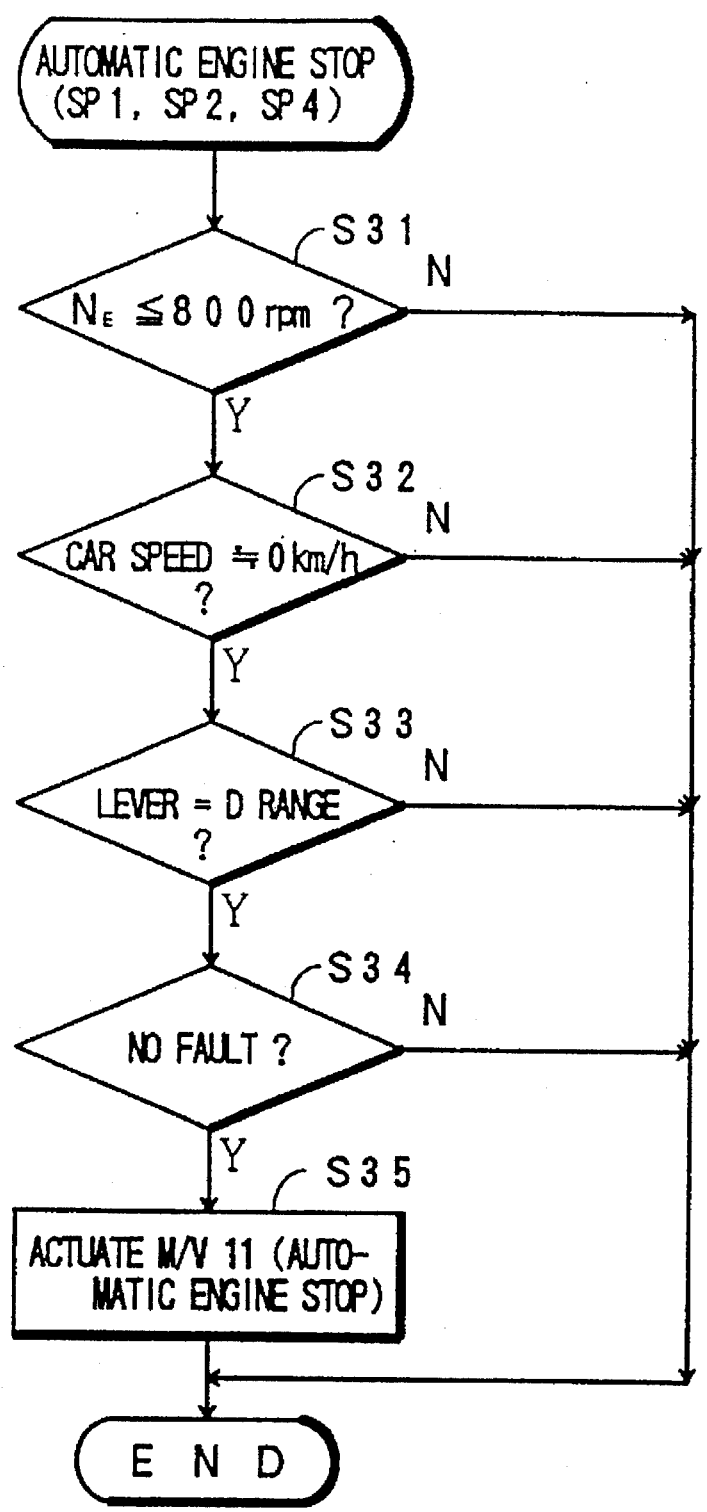
FIG. 9 is a flow chart illustrating a control program for the automatic engine stop in the automatic engine stop-start system according to the present invention (5)

FIG. 9 illustrates an automatic engine stop control program for the embodiment shown in FIG. 8 wherein the automatic stop condition corresponds to the conditions SP1, SP2, and SP4 shown in FIG. 2A.

Namely, in this control program, when it is determined that the engine speed $N_E$ is below the idling speed (800 rpm) at Step S31, that the car speed is substantially zero at Step S32, that the position of the gearshift lever 4 is in the drive range at Step S33, and that no fault is found by a self-diagnosis function (not shown) at Step S34, CPU 72 drives the electromagnetic valve 11 to automatically stop the engine at Step S35.

In this case, the gearshift lever 4 remains positioned in the drive range, and so the engine ENG is to be automatically stopped while in gear.

Figure 10:
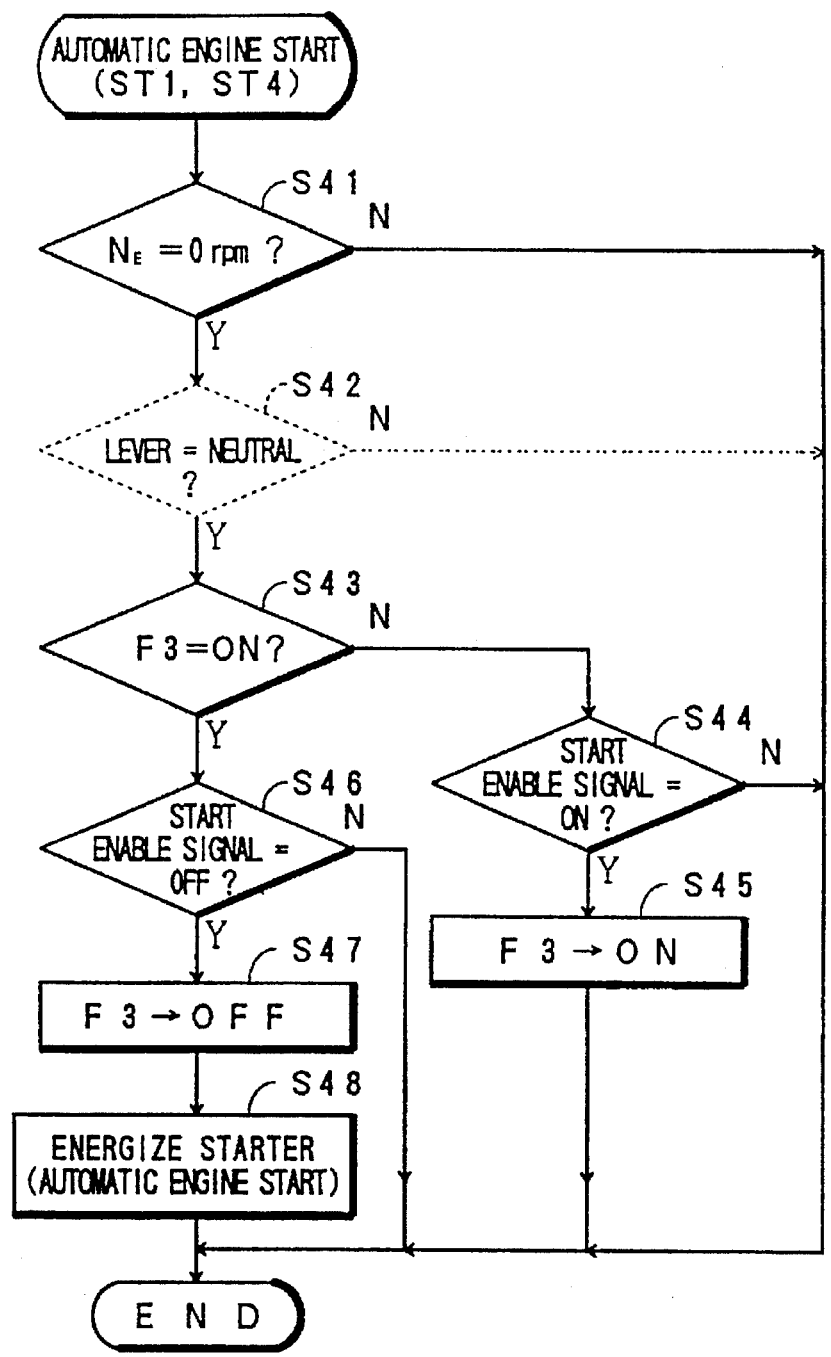
FIG. 10 is a flow chart illustrating a control program for the automatic engine start in the automatic engine stop-start system according to the present invention (5)

FIG. 10 illustrates an automatic engine start control program according to the present invention (5) wherein the automatic start condition corresponds to the conditions ST1, and ST4 shown in FIG. 3.

In this program flow chart, CPU 72 determines at Step S41 whether or not the engine speed $N_E$ is zero, if the determination results in "YES", CPU 72 will then determine at Step S42 whether or not the position of the gearshift lever 4 is neutral.

Because it is included in the condition where the automatic start enable signal is generated, Step S42 may be omitted. However, accurate confirmation of the position of the gearshift lever 4 will realize more accurate determination of the automatic start condition.

If the determination results in "YES" at Step S42, this program will proceed to Step S43 and determine whether or not Flag F3 is ON.

At this step, since Flag F3 is initially OFF, it is then determined at Step S44 whether or not the start enable signal from the control unit 70 is ON. Only if the determination results in "YES", Flag F3 will be set to "ON" at Step S45.

After Flag F3 is thus set, this program passes Step S43 in the next period of execution and proceeds to Step S46 at which it is determined whether or not the start enable signal from the AT control unit 70 is OFF.

Only if the determination results in "YES", Flag F3 will be reset to "OFF" at Step S47 and the starter motor 14 will be then energized to automatically start the engine at Step S48.

Also in this flow chart, the reason why Flag F3 is used is to confirm the presence of the start enable signal by detecting a falling edge of the signal, as illustrated in FIG. 3. Therefore, a rising edge from OFF to ON of the signal can be similarly detected, or the ON state of the signal can be detected instead.

Figure 11:
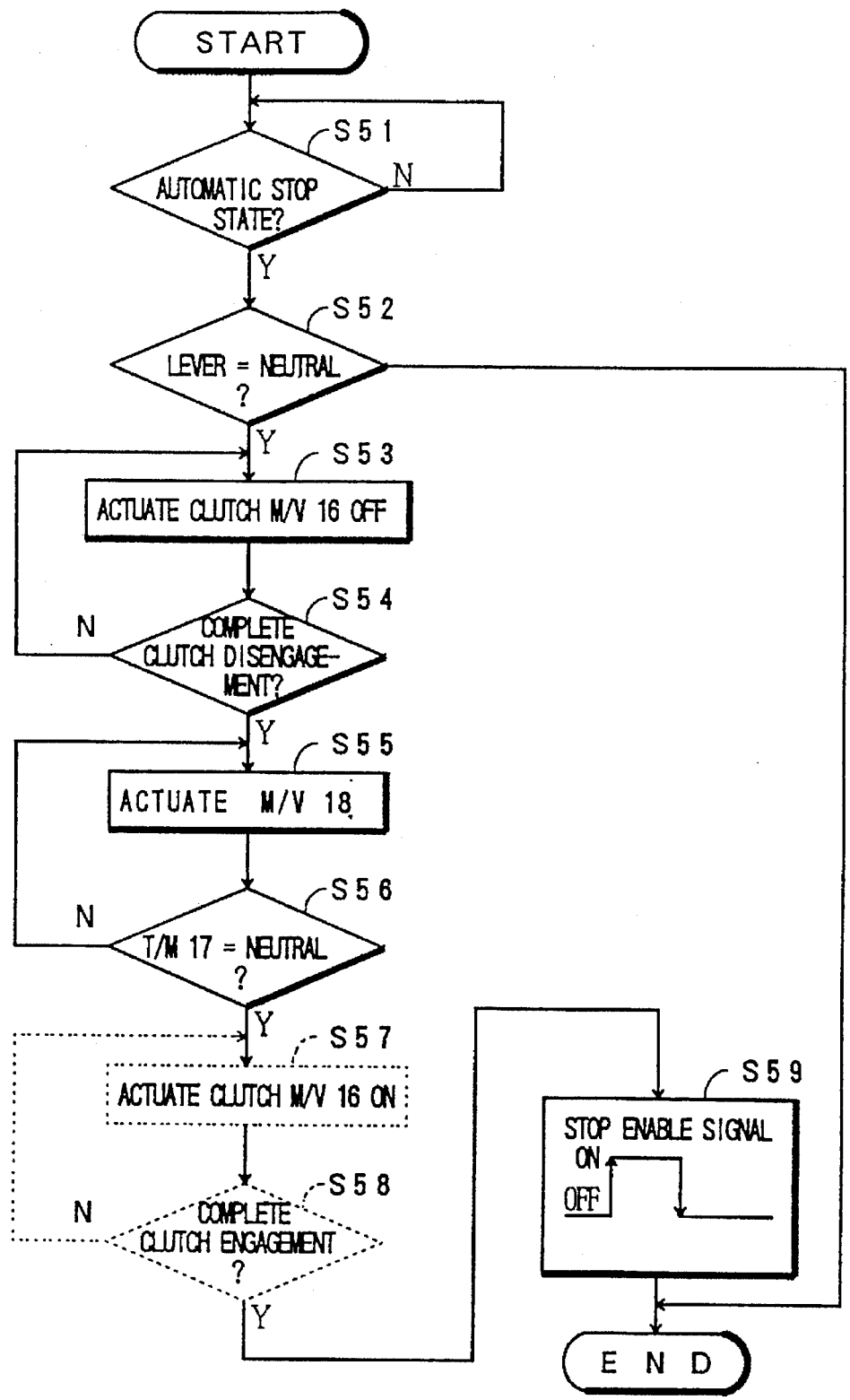
FIG. 11 is a flow chart illustrating the process of the generation of a start enable signal used in the automatic engine stop-start system according to the present invention.

FIG. 11 illustrates an automatic engine start control program for determining the condition for generating the start enable signal shown in FIG. 10, wherein the conditions S52–S59 in FIG. 11 respectively correspond to the conditions S11–S18 shown in FIG. 6.

However, to account for the condition of the engine having been automatically and already stopped in FIG. 11, Step S51 is provided prior to Step S52 to determine whether or not the engine is automatically stopped, where only if the determination results in "YES", the program will execute Step S52 and the following steps.

It is to be noted that this flow chart can also omit Steps S57 and S58 as shown by dotted lines, and an automatic transmission of a torque converter-type can omit Steps S53, S54, S57, and S58 for determining the clutch condition.

Figure 12:
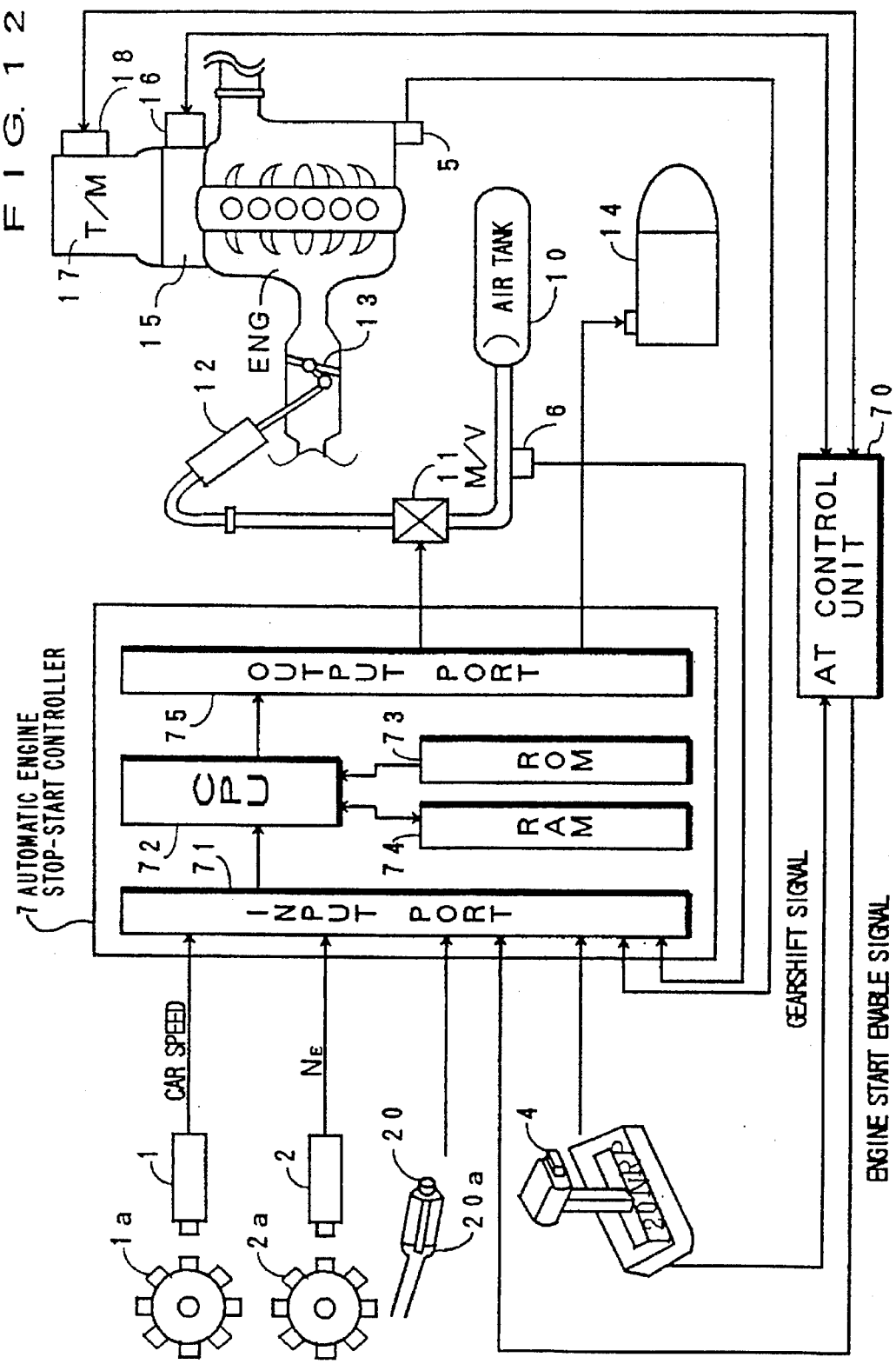
FIG. 12 is a system arrangment diagram illustrating one embodiment of the automatic engine stop-start system according to the present invention (8)

FIG. 12 shows one embodiment of the automatic engine stop-start system according to the present invention (8). This embodiment is different from the embodiment shown in FIG. 4 in that the idle position switch 30 is replaced by an engine stop switch 20 and the AT control unit 70 provides the engine start enable signal for the input port 71.

The engine stop switch 20 should be preferably provided at the head of a winker lever 20a not to burden a driver's operation.

Figure 13:
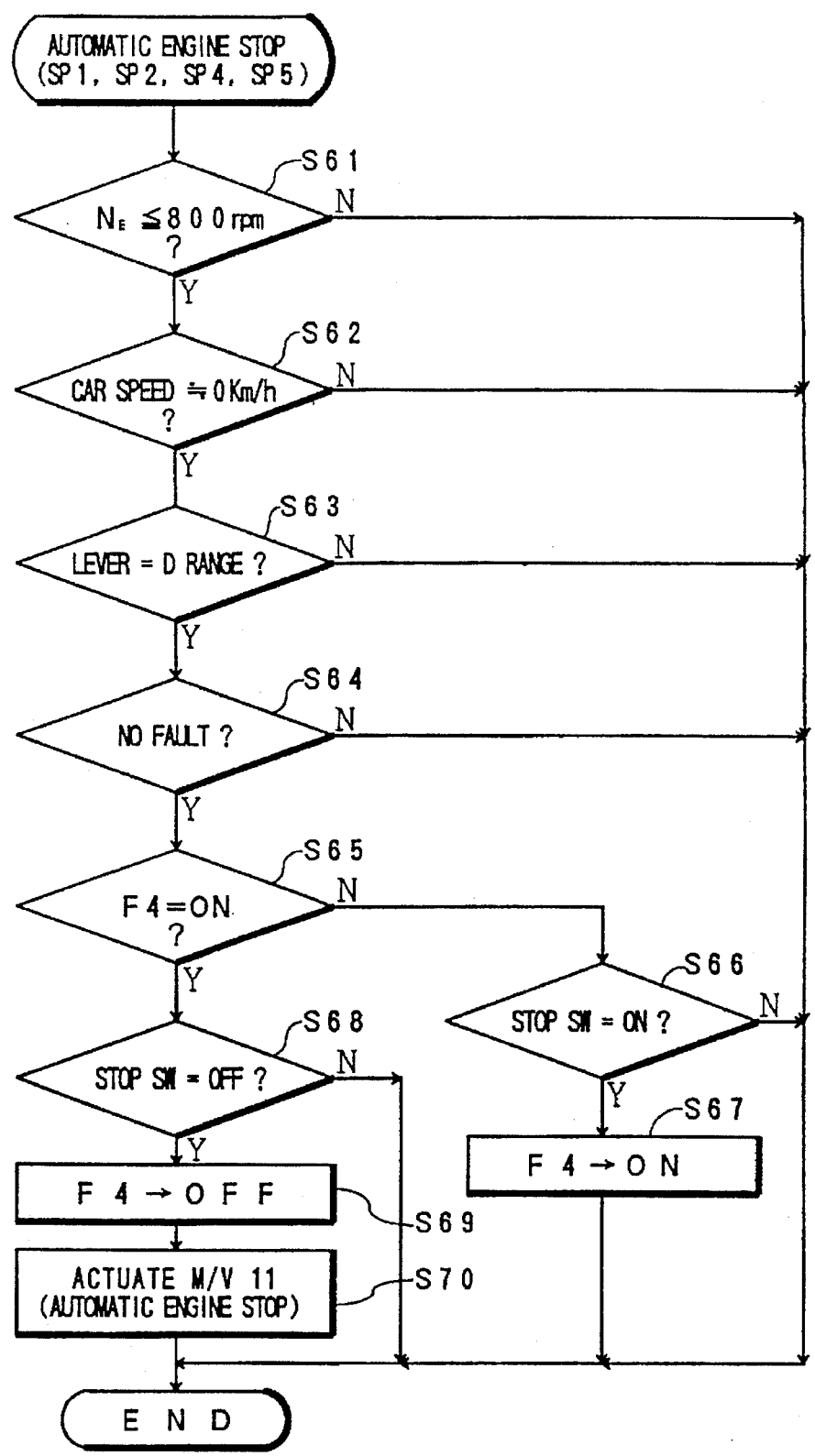
FIG. 13 is a flow chart illustrating a control program of the automatic engine stop in the automatic engine stop-start system according to the present invention (8)

FIG. 13 illustrates an automatic engine stop control program in the embodiment shown in FIG. 12, wherein the automatic stop conditions respectively correspond to the conditions SP1, SP2, SP4, and SP5 shown in FIG. 1A.

Namely, in this program flow chart, the engine speed $N_E$, the car speed, the position of the gearshift lever 4, and the presence of faults are determined at Steps S61–S64 in the same manner as Steps S31–S34 in FIG. 9. After these steps, it is determined at Step S65 whether or not Flag F4 is ON.

Since Flag F4 is initially OFF, the program goes to Step S66 to determine whether or not the stop switch 20 is ON, at which only if the determination results in "YES", Flag F4 is set to "ON" at Step S67.

After Flag F4 is thus set, when passing Step S65 again, the program proceeds to Step S68 to determine whether or not the stop switch 20 is OFF. Only if the determination results in "YES", Flag F4 is reset at Step S69, and then the electromagnetic valve 11 is energized to automatically stop the engine ENG at Step S70.

Also in this flow chart, determination regarding the operation of the stop switch 20 is conducted using a falling edge of the output signal of the switch 20 while a rising edge thereof can similarly be used. Furthermore, the ON state of the signal can be used instead.

The conditions for automatic engine start determined in the embodiment shown in FIG. 12 correspond to the conditions ST1 and ST4, as already described with reference to the flow chart in FIG. 10, so that the description is omitted.

Figure 14:
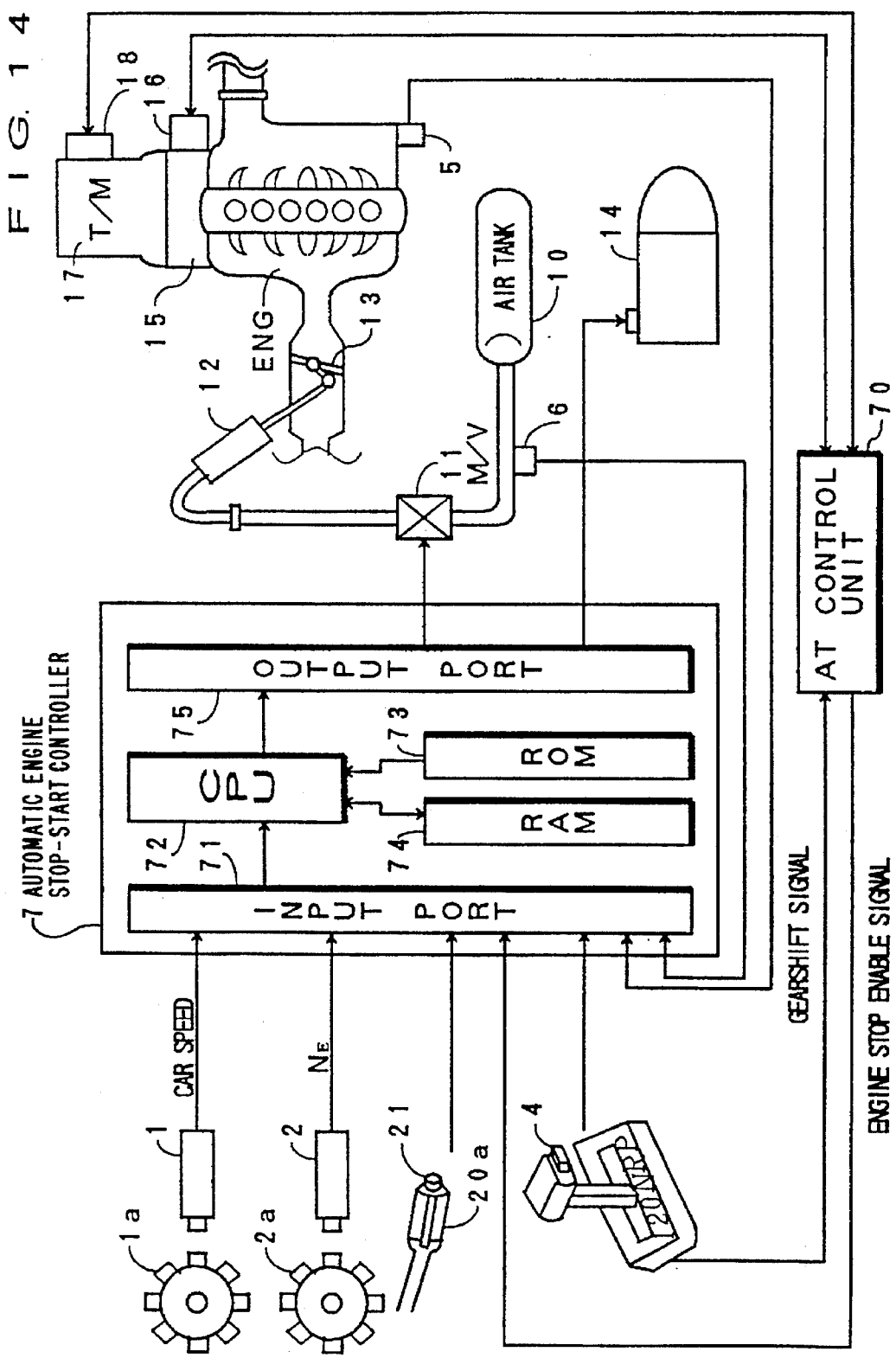
FIG. 14 is a system arrangement diagram illustrating one embodiment of the automatic engine stop-start system according to the present invention (3); and, FIG. 15 is a flow chart illustrating a control program for the automatic engine start in the automatic engine stop-start system according to the present invention (3).

FIG. 14 shows one embodiment of the automatic engine stop-start system according to the present invention (3). This embodiment is different from the embodiment shown in FIG. 12 in that the engine stop switch 20 is replaced by an engine start switch 21 and the AT control unit 70 provides the engine stop enable signal for the input port 71.

The engine start switch 21 should be also preferably provided at the head of a winker lever 20a not to burden a driver's operation.

Since the automatic engine stop condition in this embodiment is the same as the control program in FIG. 5 illustrating the automatic stop condition according to the present invention (3), the description is hereby omitted.

Figure 15:
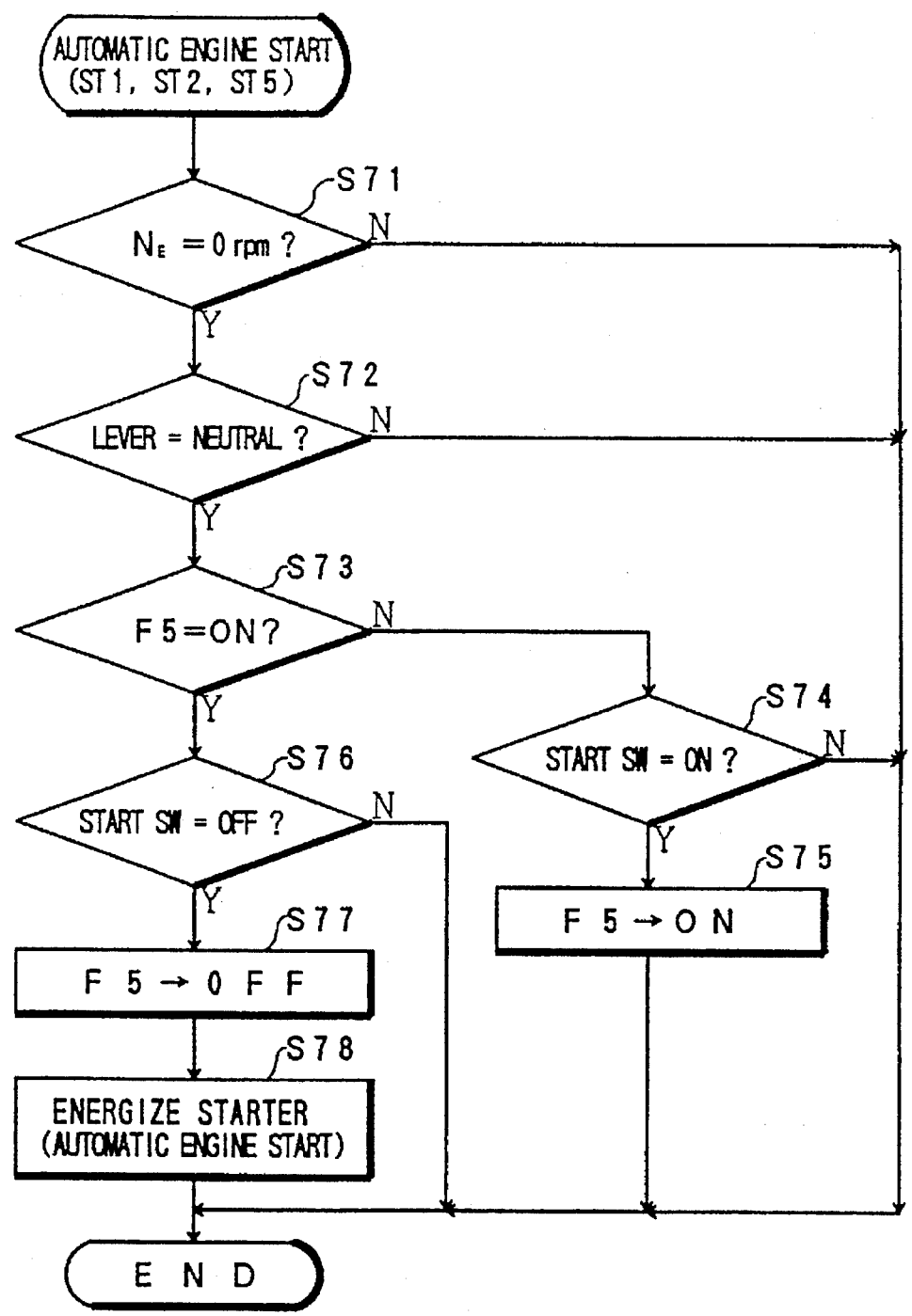

FIG. 15 illustrates an automatic engine stop control program in the embodiment shown in FIG. 14, wherein the automatic start conditions respectively correspond to the conditions ST1, ST2, and ST5 shown in FIG. 3.

Namely, CPU 72 determines whether or not the engine speed $N_E$ is zero at Step S71. If the determination results in "YES", it will be then determined whether or not the gearshift lever 4 is positioned neutral at Step S72. Only if the determination results in "YES", it will be then determined whether or not Flag F5 is set to "ON" at Step S73.

Since Flag F5 is initially OFF, the program proceeds to Step S74 to determine whether or not the start switch 21 is ON. If the determination results in "YES", Flag F5 is set to "ON" at Step S75.

After Flag F5 is thus set, when Step S73 is executed next time, the program proceeds from Step S73 to Step S76 to determine whether or not the start switch 21 is OFF.

Only if the determination results in "YES", Flag F5 will be reset at Step S77, and then the starter motor 14 is energized to automatically start the engine ENG at Step S78.

Also in this flow chart, determination regarding sure operation of the start switch 21 is conducted using a rising edge of the output signal of the switch 21 while a falling edge thereof can similarly be used. Furthermore, the ON state of the switch 21 can be used instead.

It is to be noted that the above embodiments employ a coolant temperature sensor 5 and the air sensor 6 which may be adopted when the automatic stop condition is extended as shown by dotted lines in FIG. 1A.

Having described the present invention by way of the preferred embodiment, it can be seen how the objects of the invention have been attained. As this invention may be embodied in several forms without departing from the spirit of the invention, the present embodiment is therefore illustrative and not restrictive since the scope of the invention is defined by the appended claims and includes such equivalent forms as will be apparent to those skilled in the art.

What is claimed is:

1. An automatic engine stop-start system which automatically stops an engine to reduce fuel consumption whenever an automatic stop condition is fulfilled and automatically starts said engine whenever an automatic start condition is fulfilled, comprising:

means for detecting a gearshift lever position of an automatic transmission;

means for detecting an idling state where an accelerator pedal is not stepped on; and, a transmission control unit generating a stop enable signal when said gearshift lever position is neutral;

said automatic stop condition being dependent upon an engine rotating speed, a car speed, and the presence of said stop enable signal, and said automatic start condition being dependent upon the engine rotating speed, said gearshift lever position, and the presence of said idling state, said transmission control unit determining the presence of said automatic stop and start enable signals from rising or falling edges of the automatic stop and start enable signals.

2. An automatic engine stop-start system which automatically stops an engine to reduce fuel consumption whenever an automatic stop condition is fulfilled and automatically starts said engine whenever an automatic start condition is fulfilled, comprising:

means for detecting a gearshift lever position of an automatic transmission; and, a transmission control unit generating a stop enable signal when said gearshift lever position is neutral and generating a start enable signal during an automatic stop state;

said automatic stop condition being dependent upon an engine rotating speed, a car speed, and the presence of said stop enable signal, and said automatic start condition being dependent upon an engine rotating speed and the presence of said start enable signal, said transmission control unit determining the presence of said automatic stop and start enable signals from rising or falling edges of the automatic stop and start enable signals.

3. An automatic engine stop-start system which automatically stops an engine to reduce fuel consumption whenever an automatic stop condition is fulfilled and automatically starts said engine whenever an automatic start condition is fulfilled, comprising:

means for detecting a gearshift lever position of an automatic transmission;

means for manually starting said engine; and, a transmission control unit generating a stop enable signal when said gearshift lever position is neutral;

said automatic stop condition being dependent upon an engine rotating speed, a car speed, and the presence of said stop enable signal, and said automatic start condition being dependent upon the engine rotating speed, said gearshift lever position, and the presence of the operation of said manually starting means, said transmission control unit determining the presence of said automatic stop and start enable signals from rising or falling edges of the automatic stop and start enable signals.

4. An automatic engine stop-start system which automatically stops an engine to reduce fuel consumption whenever an automatic stop condition is fulfilled and automatically starts said engine whenever an automatic start condition is fulfilled, comprising:

means for detecting a gearshift lever position of an automatic transmission; and, means for detecting an idling state where an accelerator pedal is not stepped on;

said automatic stop condition being dependent upon an engine rotating speed, a car speed, and the determination of whether said gearshift lever position is in a drive range, and said automatic start condition being dependent upon the engine rotating speed, said gearshift lever position, and the presence of said idling state.

5. An automatic engine stop-start system which automatically stops an engine to reduce fuel consumption whenever an automatic stop condition is fulfilled and automatically starts said engine whenever an automatic start condition is fulfilled, comprising;

means for detecting a gearshift lever position of an automatic transmission; and, a transmission control unit generating a start enable signal when said gearshift lever position is neutral and the present state is an automatic stop state;

said automatic stop condition being dependent upon an engine rotating speed, a car speed, and the determination of whether said gearshift lever position is in a drive range, and said automatic start condition being dependent upon the engine rotating speed, and the presence of said start enable signal.

6. An automatic engine stop-start system which automatically stops an engine to reduce fuel consumption whenever an automatic stop condition is fulfilled and automatically starts said engine whenever an automatic start condition is fulfilled, comprising:

means for detecting a gearshift lever position of an automatic transmission;

means for manually stopping said engine; and, means for detecting an idling state;

said automatic stop condition being dependent upon an engine rotating speed, a car speed, the determination of whether said gearshift lever position is in a drive range, and the presence of the operation of said manually stopping means, and said automatic start condition being dependent upon engine rotating speed, said gearshift lever position, and the presence of said idling state.

7. An automatic engine stop-start system which automatically stops an engine to reduce fuel consumption whenever an automatic stop condition is fulfilled and automatically starts said engine whenever an automatic start condition is fulfilled, comprising:

means for detecting a gearshift lever position of an automatic transmission;

means for manually stopping said engine; and, a transmission control unit generating a start enable signal when said gearshift lever position is neutral and the present state is an automatic stop state;

said automatic stop condition being dependent upon an engine rotating speed, a car speed, the determination of whether said gearshift lever position is in a drive range, and the presence of the operation of said manually stopping means, and said automatic start condition being dependent upon the engine rotating speed, and the presence of said start enable signal.

8. An automatic engine stop-start system according to any one of claims 5 or 7 wherein said transmission control unit determines the presence of said automatic stop and start enable signals from rising or falling edges of the automatic stop and start enable signals.

9. An automatic engine stop-start system according to any one of claims 1, 2, 3, 5 or 7 wherein said automatic stop and start conditions include determining if said gearshift lever position is neutral.

10. An automatic engine stop-start system which automatically stops an engine to reduce fuel consumption whenever an automatic stop condition is fulfilled and automatically starts said engine whenever an automatic start condition is fulfilled, comprising:

means for detecting a gearshift lever position of an automatic transmission;

means for detecting an idling state;

a transmission control unit;

means for manually stopping said engine; and, means for manually starting said engine;

the automatic stop condition being dependent upon an engine rotating speed, a car speed, the determination of whether said gearshift lever position is in a drive range, and the presence of the operation of said manually stopping means, and said automatic start condition being dependent upon the engine rotating speed, said gearshift lever position, and the presence of the operation of said manually starting means, said transmission control unit determining the presence of the respective output signals of said idling state detecting means and said manually stopping and starting means from rising or falling edges of the respective output signals.

11. An automatic engine stop-start system which automatically stops an engine to reduce fuel consumption whenever an automatic stop condition is fulfilled and automatically starts said engine whenever an automatic start condition is fulfilled, comprising:

means for detecting a gearshift lever position of an automatic transmission;

means for detecting an idling state where an accelerator pedal is not stepped on; and, a transmission control unit generating a stop enable signal when said gearshift lever position is neutral;

said automatic stop condition being dependent upon an engine rotating speed, a car speed, and the presence of said stop enable signal, and said automatic start condition being dependent upon the engine rotating speed, said gearshift lever position, and the presence of said idling state wherein said transmission control unit determines the presence of the respective output signals of said idling state detecting means from rising or falling edges of the respective output signals.

* * * * *

UNITED STATES PATENT AND TRADEMARK OFFICE
CERTIFICATE OF CORRECTION

PATENT NO. : 5,653,659
DATED : August 5, 1997
INVENTOR(S) : Yujiro KUNIBE, et al It is certified that error appears in the above-indentified patent and that said Letters Patent is hereby corrected as shown below:

Column 5,   line 4, after "is" insert --in--;

line 44, change "start and stop" to --stop and start--.

Column 7,   line 53, change "312" to --S12--.

Column 9,   line 43, change ", if" to --. If--.

Signed and Sealed this

Tenth Day of February, 1998

Attest:

BRUCE LEHMAN

Attesting Officer              Commissioner of Patents and Trademarks